United States Patent
Milroy et al.

(10) Patent No.: US 11,286,389 B2
(45) Date of Patent: Mar. 29, 2022

(54) 3D PRINTING METHOD UTILIZING THERMOPLASTIC SILICONE COMPOSITION

(71) Applicant: DOW SILICONES CORPORATION, Midland, MI (US)

(72) Inventors: Zachary Milroy, Midland, MI (US); Sara Schaubroeck, Midland, MI (US); Bizhong Zhu, Midland, MI (US)

(73) Assignee: DOW SILICONES CORPORATION, Midland, MI (US)

( * ) Notice: Subject to any disclaimer, the term of this patent is extended or adjusted under 35 U.S.C. 154(b) by 589 days.

(21) Appl. No.: 15/758,862

(22) PCT Filed: Sep. 9, 2016

(86) PCT No.: PCT/US2016/050933
§ 371 (c)(1),
(2) Date: Mar. 9, 2018

(87) PCT Pub. No.: WO2017/044735
PCT Pub. Date: Mar. 16, 2017

(65) Prior Publication Data
US 2018/0281276 A1    Oct. 4, 2018

Related U.S. Application Data

(60) Provisional application No. 62/216,476, filed on Sep. 10, 2015.

(51) Int. Cl.
*B29C 64/124*    (2017.01)
*C08L 83/04*     (2006.01)
*B33Y 70/00*     (2020.01)
*B33Y 10/00*     (2015.01)
*C08L 75/04*     (2006.01)
*C08G 77/12*     (2006.01)
*C08G 77/20*     (2006.01)
*B29K 83/00*     (2006.01)
*B29K 101/12*    (2006.01)

(52) U.S. Cl.
CPC ............ *C08L 83/04* (2013.01); *B29C 64/124* (2017.08); *B33Y 10/00* (2014.12); *B33Y 70/00* (2014.12); *C08L 75/04* (2013.01); *B29K 2083/00* (2013.01); *B29K 2101/12* (2013.01); *C08G 77/12* (2013.01); *C08G 77/20* (2013.01)

(58) Field of Classification Search
CPC .............................. B33Y 10/00; B29C 64/124
USPC ....................................................... 264/401
See application file for complete search history.

(56) References Cited

U.S. PATENT DOCUMENTS

| 3,419,593 A | 12/1968 | Willing |
| 4,766,176 A | 8/1988 | Lee et al. |
| 5,017,654 A | 5/1991 | Togashi et al. |
| 5,204,055 A | 4/1993 | Sachs et al. |
| 5,387,380 A | 2/1995 | Cima et al. |
| 5,844,031 A | 12/1998 | Chen et al. |
| 8,093,333 B2 | 1/2012 | Fujisawa et al. |
| 2015/0344682 A1 | 12/2015 | Ganapathiappan et al. |
| 2017/0283655 A1 | 10/2017 | Kenney et al. |

FOREIGN PATENT DOCUMENTS

| CN | 104559196 A | 4/2015 |
| CN | 104829840 A | 8/2015 |
| CN | 104837920 A | 8/2015 |
| JP | 2005097594 A | 4/2005 |
| JP | 2005531439 A | 10/2005 |
| JP | 2006343434 A | 12/2006 |
| JP | 2007051237 A | 3/2007 |
| JP | 2017519661 A | 7/2017 |
| WO | 2004003823 A1 | 1/2004 |
| WO | WO2014044759 A1 | 3/2014 |
| WO | WO2014124389 A1 | 8/2014 |
| WO | WO2014201224 A1 | 12/2014 |
| WO | 2015/048155 A1 | 4/2015 |
| WO | WO2015107333 A1 | 7/2015 |
| WO | 2015/195527 A1 | 12/2015 |
| WO | 2015195527 A1 | 12/2015 |
| WO | WO2016044547 A1 | 3/2016 |
| WO | WO2017040874 A1 | 3/2017 |

OTHER PUBLICATIONS

English abstract of JP2007051237A (Year: 2007).*
"Manufacturing Changes Design, 3D Printing Direct Manufacturing Technology", Yongqiang Yang et al., pp. 131, Jun. 2014.
"Mechanical Engineering Materials and Materials Design and Selection", Lian Shen et al., pp. 111, Apr. 1996.
"Organic Silicon Product Synthesis Process and Application", Guoqiao Lai et al., pp. 312 and 685, Jan. 2010.
PCT/US2016/050933 International Search Report dated Nov. 24, 2016, 5 pages.
English language abstract and machine translation for CN104559196 (A) extracted from http://worldwide.espacenet.com database on Mar. 1, 2018, 15 pages.

(Continued)

*Primary Examiner* — Christina A Johnson
*Assistant Examiner* — Xue H Liu
(74) *Attorney, Agent, or Firm* — Warner Norcross + Judd LLP

(57) ABSTRACT

A method of forming a three-dimensional (3D) article is disclosed. The method comprises I) printing a first thermoplastic silicone composition with a 3D printer to form an at least partially solidified layer. The method further comprises II) printing a second thermoplastic silicone composition on the at least partially solidified layer with the 3D printer to form a subsequent at least partially solidified layer. Optionally, step II) may be repeated with independently selected thermoplastic silicone composition(s) for any additional layer(s) to form the 3D article. The first and second thermoplastic silicone compositions are the same as or different from one another.

13 Claims, No Drawings

(56) References Cited

OTHER PUBLICATIONS

English language abstract and machine translation for CN104829840 (A) extracted from http://worldwide.espacenet.com database on Mar. 1, 2018, 13 pages.
"Silicone Elastomer Solutions for Portable Electronics," Product Information for TPSiV, Multibase, Form No. 70-1024A-01, 16 pages.
Tabulation of Abstracts, 29 total, SciFinder, 18 pages.
Machine assisted English translation of JP2005097594A obtained from https://patents.google.com/patent on Oct. 19, 2020, 13 pages.
Machine assisted English translation of JP2006343434A obtained from https://patents.google.com/patent on Oct. 19, 2020, 8 pages.
Machine assisted English translation of JP2007051237A obtained from https://patents.google.com/patent on Oct. 19, 2020, 13 pages.

\* cited by examiner

3D PRINTING METHOD UTILIZING THERMOPLASTIC SILICONE COMPOSITION

CROSS-REFERENCE TO RELATED APPLICATIONS

This application is the National Stage of International Application No. PCT/US2016/050933 filed on 9 Sep. 2016, which claims priority to and all advantages of U.S. Pat. Appl. No. 62/216,476 filed on 10 Sep. 2015, the content of which is hereby incorporated by reference.

The present invention generally relates to a method of forming an article and, more specifically, to a method of forming a three-dimensional (3D) article utilizing a thermoplastic silicone composition, and to a 3D article formed thereby.

3D printing or additive manufacturing (AM) is a process of making 3D solid objects, typically from a digital file. The creation of a 3D printed object is achieved using additive processes rather than subtractive processes. In an additive process, an object is created by laying down successive layers of material until the entire object is created. Each of these layers can be seen as a thinly sliced horizontal cross-section of the eventual object.

Unfortunately, conventional additive processes are limited to certain types of materials, such as organics (e.g. polylactic acid (PLA) or acrylonitrile butadiene styrene (ABS)), plaster, clay, room temperature vulcanization (RTV) materials, paper, or metal alloys. These materials are unsuitable in certain end applications based on physical or chemical limitations, including those relating to resistance to heat, moisture, radiation, and weathering, as well as concerns involving cost, slow solidification (or cure) times, improper viscosity, etc. In view of the foregoing, there remains an opportunity to provide improved methods of forming 3D articles as well as an opportunity to provide improved materials suitable for 3D printing.

BRIEF SUMMARY OF THE INVENTION

Disclosed is a method of forming a three-dimensional (3D) article. The method comprises I) printing a first thermoplastic silicone composition with a 3D printer to form an at least partially solidified layer. The method further comprises II) printing a second thermoplastic silicone composition on the at least partially solidified layer with the 3D printer to form a subsequent at least partially solidified layer. Optionally, step II) may be repeated with independently selected thermoplastic silicone composition(s) for any additional layer(s) to form the 3D article. The first and second thermoplastic silicone compositions are the same as or different from one another.

A 3D article formed in accordance with the method is also disclosed.

DETAILED DESCRIPTION

The term "about" as used herein serves to reasonably encompass or describe minor variations in numerical values measured by instrumental analysis or as a result of sample handling. Such minor variations may be in the order of plus or minus 0% to 10% or plus or minus 0% to 5% of the numerical values.

The term "branched" as used herein describes a polymer with more than two end groups.

The term "comprising" is used herein in its broadest sense to mean and to encompass the notions of "include" and "consist of."

The term "ambient temperature" or "room temperature" refers to a temperature between about 20° C. and about 30° C. Usually, room temperature ranges from about 20° C. to about 25° C.

The use of "for example" or "such as" to list illustrative examples does not limit to only the listed examples. Thus, "for example" or "such as" means "for example, but not limited to" or "such as, but not limited to" and encompasses other similar or equivalent examples.

The term "substituted" as used in relation to another group, for example, a hydrocarbon group, means, unless indicated otherwise, one or more hydrogen atoms in the hydrocarbon group has been replaced with another substituent. Examples of such substituents include, for example, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as amines, amino-functional groups, amido-functional groups, and cyano-functional groups; sulphur atoms; and sulphur atom containing groups such as mercapto groups.

All viscosity measurements referred to herein were measured at 25° C. unless otherwise indicated.

An organopolysiloxane means a polymer or resin comprising multiple organosiloxane or polyorganosiloxane groups per molecule. Organopolysiloxane is intended to include polymers substantially containing only organosiloxane or polyorganosiloxane groups in the polymer chain, and polymers where the backbone contains both organosiloxane and/or polyorganosiloxane groups and organic polymer groups in the polymer chain. Such polymers may be homopolymers or copolymers, including, for example, block copolymers and random copolymers. Organopolysiloxane is also intended to include resins having a three-dimensional crosslinked network.

The term "thermoplastic" means any material that is flowable at an elevated temperature above room temperature with or without the application of any force or pressure on the material and which solidifies to substantially retain its shape upon cooling to a lower temperature, e.g. room temperature (or a temperature greater than room temperature but less than the elevated temperature). Thermoplastic materials may be referred to as "melt-processable" materials herein.

By "substantially retains its shape," with reference to a material substantially retaining its shape, it is meant that a majority of the material retains its shape, e.g. the material does not flow or deform upon exposure to ambient conditions. Substantially may mean that at least about 50%, 60%, 70%, 80%, 90%, 95%, 96%, 97%, 98%, 99%, 99.5%, 99.9%, 99.99%, or at least about 99.999% or more of the volume of the material is maintained in the same shape and dimension over a period of time, e.g. after 1 minute, 5 minutes, 10 minutes, 30 minutes, 1 hour, 4 hours, 8 hours, 12 hours, 1 day, 1 week, 1 month, etc. Said differently, substantially retaining shape means that gravity does not substantially impact shape of the material upon exposure to ambient conditions.

Disclosed is a method of forming a three-dimensional (3D) article ("method"). The 3D article is formed with independently selected thermoplastic silicone compositions, which are also described below, along with various aspects relating to the 3D articles formed in accordance with the inventive method.

Method

The method comprises the step of I) printing a first thermoplastic silicone composition with a 3D printer to form an at least partially solidified layer. Various types of 3D printers and/or 3D printing methodologies (i.e., "3D printing processes") can be used as described in detail below. As also described below, various types of thermoplastic silicone compositions can be utilized in the inventive method.

In various embodiments, the first thermoplastic silicone composition is generally printed on a substrate such that a layer is formed on the substrate. In these embodiments, the at least partially solidified layer is formed from at least partial solidification of the layer, which may occur as the layer is being formed and/or after the layer is formed. Alternatively, the first thermoplastic silicone composition may at least partially solidify during the step of printing, e.g. as the first thermoplastic composition passes from the 3D printer to the substrate, in which case the at least partially solidified layer is formed in situ without first forming a layer that is not at least partially solidified. For purposes of clarity, although the at least partially solidified layer may be formed directly by printing the first thermoplastic silicone composition or by first forming the layer which at least partially solidifies to give the at least partially solidified layer, the description below refers to "the layer." This description regarding "the layer" is applicable to either embodiment, i.e., both when the at least partially solidified layer is formed directly by printing the first thermoplastic silicone composition or by first forming the layer which at least partially solidifies to give the at least partially solidified layer. Said differently, any description below relating to the layer may also extend to the at least partially solidified layer (e.g. in terms of dimension, etc.), particularly where the layer is not first formed and cooled to give the at least partially solidified layer.

The substrate is not limited and may be any substrate. The substrate typically can support the 3D article during its method of forming. However, the substrate may itself be supported, e.g. by a table, such that the substrate itself need not have rigidity. The substrate may be rigid or flexible, and may be discontinuous or continuous in at least one of thickness and composition. The substrate may include a coating or other film such that the substrate is removable, e.g. peelable, from the 3D article. Alternatively, the 3D article may physically and/or chemically bond to the substrate such that the 3D article and the substrate are together. In one embodiment, the substrate may comprise a silicone, e.g. an already cured silicone, such that the substrate becomes integral with the 3D article. The substrate may be a mold or any other object or article.

The layer formed by printing the first thermoplastic silicone composition may have any shape and dimension. For example, the layer need not be continuous, as in a conventional layer. The layer need not have a consistent thickness. Depending on a desired shape of the 3D article formed by the method, the layer may take any form.

The layer formed by printing the first thermoplastic silicone composition forms an at least partially solidified layer. For example, the first thermoplastic silicone composition is typically flowable, e.g. at an elevated temperature with or without the application of a force or pressure. However, the layer comprising the first thermoplastic silicone composition generally solidifies to form the at least partially solidified layer as the layer is cooled from the elevated temperature. The elevated temperature at which the first thermoplastic silicone composition becomes flowable—with or without the application of pressure or any force—and the temperature at which the first thermoplastic silicone composition solidifies is dependent on the selection of the first thermoplastic silicone composition, as described below. When the first thermoplastic silicone composition is flowable at elevated temperatures, it may be referred to as a melt.

In certain embodiments, the elevated temperature utilized to melt the first thermoplastic silicone composition or to ensure that the first thermoplastic silicone composition is flowable is at least 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, or 225, ° C. This elevated temperature may be as high as, for example, 400 or 500° C. In one embodiment, the elevated temperature is from 150 to 300, alternatively from 150 to 250, ° C.

The first thermoplastic silicone composition is generally at the elevated temperature as it is printed to form the layer. Depending on the type of 3D printer utilized, as disclosed in greater detail below, the first thermoplastic silicone composition may be heated in any manner and at any time, e.g. before being disposed in, or while being disposed in, the 3D printer or any components associated therewith, e.g. a nozzle. For example, the first thermoplastic silicone composition may be a solid, e.g. a pelletized solid, which is fed into the 3D printer and heated to a flowable state as in a conventional extrusion process. Alternatively or in addition, the first thermoplastic silicone composition may be heated in the nozzle or other dispenser associated with the 3D printer. Further, ambient conditions may be manipulated or selectively controlled such that the air temperature during the step of printing is also an elevated or cooled temperature.

Similarly, the layer formed by printing the first thermoplastic silicone composition may be cooled to form the at least partially solidified layer in any manner. For example, in various embodiments the layer may form the at least partially solidified layer by virtue of being exposed to room temperature or ambient conditions for a period of time, in which case no active step of cooling is utilized. When the ambient conditions are not selectively controlled such that the layer is exposed to room temperature upon printing, e.g. when first thermoplastic silicone composition is heated to the elevated temperature prior to be disposed in and/or while being disposed in the 3D printer or a component thereof (including a nozzle or dispenser), the layer will readily solidify upon the step of printing. The time period associated with solidification of the layer is dependent on many factors, including dimensions of the layer and rate at which the layer is cooled.

Alternatively or in addition, an active cooling step may be utilized to accelerate solidification or at least partial solidification of the layer. For example, ambient conditions may be selectively controlled such that the first thermoplastic silicone composition and the layer are cooled during and/or after the step of printing. In various embodiments, the layer is not cooled during the step of printing to prevent any premature solidification of the first thermoplastic silicone composition as it is printed. The layer may be transported to a cooled environment, the temperature may be decreased below room temperature, or other cooling techniques may be utilized to accelerate solidification of the layer to give the at least partially solidified layer.

Solidification of the layer comprising the first thermoplastic silicone composition is distinguished from curing of thermosetting silicone compositions. For example, solidification is generally indicative of cure in thermosetting silicone compositions, and cure generally results in modification of physical and/or chemical properties of the cured material, e.g. in view of an increased crosslink density. In contrast, for thermosetting silicone compositions, solidification generally results in a solid, but not a change in crosslink density of the solid. However, as described below, certain thermoplastic silicone compositions may undergo at least some curing while being re-processable without departing from the scope of the disclosure.

In certain embodiments, the at least partially solidified layer substantially retains its shape upon exposure to ambient conditions. Ambient conditions refer to at least temperature, pressure, relative humidity, and any other condition that may impact a shape or dimension of the at least partially solidified layer. For example, ambient temperature is room temperature in the context of ambient conditions. Ambient conditions are distinguished manipulated or controlled conditions, e.g. where heat (or elevated temperature) is utilized, such as to form the melt. By "substantially retains its shape," it is meant that a majority of the at least partially solidified layer retains its shape, e.g. the at least partially solidified layer does not flow or deform upon exposure to ambient conditions. Substantially may mean that at least about 50%, 60%, 70%, 80%, 90%, 95%, 96%, 97%, 98%, 99%, 99.5%, 99.9%, 99.99%, or at least about 99.999% or more of the volume of the at least partially solidified layer is maintained in the same shape and dimension over a period of time, e.g. after 1 minute, 5 minutes, 10 minutes, 30 minutes, 1 hour, 4 hours, 8 hours, 12 hours, 1 day, 1 week, 1 month, etc. Said differently, substantially retaining shape means that gravity does not substantially impact shape of the at least partially solidified layer upon exposure to ambient conditions. The shape of the at least partially solidified layer may also impact whether the at least partially solidified layer substantially retains its shape. For example, when the at least partially solidified layer is rectangular or has another simplistic shape, the at least partially solidified layer may be more resistant to deformation at even lesser levels of solidification than at least partially solidified layers having more complex shapes.

The method further comprises the step of II) printing a second thermoplastic silicone composition on the at least partially solidified layer with the 3D printer to form a subsequent at least partially solidified layer. The 3D printer may be the same as or different from the 3D printer utilized in step I). As described below, the second thermoplastic silicone composition may be the same as or different from the first thermoplastic silicone composition.

Like the first thermoplastic silicone composition and the at least partially solidified layer, printing the second thermoplastic silicone composition may directly form the subsequent at least partially solidified layer, or printing the second thermoplastic silicone composition may form a subsequent layer. In the latter embodiment where printing the second thermoplastic silicone composition forms a subsequent layer, the subsequent at least partially solidified layer may be formed by cooling the subsequent layer.

Conditions and parameters associated with printing the first thermoplastic silicone composition and the second thermoplastic silicone composition may be independently selected. The description above relating to printing of the first thermoplastic silicone composition is also applicable to printing of the second thermoplastic silicone composition.

For example, the second thermoplastic silicone composition is generally at an elevated temperature as it is printed, and the elevated temperature may be the same as or different from the elevated temperature of the first thermoplastic silicone composition as it is printed. Similarly, ambient conditions may be manipulated or selectively controlled such that the air temperature during the step of printing is also an elevated temperature, with such ambient conditions differing or being the same between the steps of printing the first and second thermoplastic silicone compositions.

When printing the second thermoplastic silicone compositions results in the subsequent layer, the subsequent layer may be cooled to form the subsequent at least partially solidified layer in any manner, including any of those described above with respect to forming the at least partially solidified layer from the layer.

In certain embodiments, the subsequent at least partially solidified layer substantially retains its shape upon exposure to ambient conditions, as defined above with respect to the at least partially solidified layer.

The at least partially solidified layer (or layer or first, prior, or previous layer), subsequent at least partially solidified layer (or subsequent layer or second or latter layer), and any additional layer(s), optionally present as described below, are collectively referred to herein as "the layers." "The layers," as used herein in plural form, may relate to the layers at any stage of the inventive method, e.g. in an unsolidified state, in a partially solidified state, in a solid state, etc. The term "layer" in singular form designates the first layer printed with the first thermoplastic silicone composition (and may be used interchangeably with "the at least partially solidified layer" depending on the particular embodiment).

As with the layer, the subsequent layer formed by printing the second thermoplastic silicone composition may have any shape and dimension. For example, the subsequent layer need not be continuous or have a consistent thickness. Further, the subsequent layer may differ from the layer in terms of shape, dimension, size, etc. The subsequent layer may only contact a portion of an exposed surface of the at least partially solidified layer. For example, depending on the desired shape of the 3D article, the subsequent layer may build on the layer selectively.

In certain embodiments, printing of the subsequent layer occurs before the at least partially solidified layer has reached a fully solidified state, i.e., while the at least partially solidified layer is at least partially pliable upon the application of force. In certain embodiments, depending on a level of solidification of the at least partially solidified layer, there may be at least some intermixing between the at least partially solidified layer and the subsequent layer at the print line. There may be certain advantages in such intermixing. The layers may also be formed around one or more substructures that can provide support or another function of the 3D article.

The layers can each be of various dimensions, including thickness and width. Thickness and/or width tolerances of the layers may depend on the 3D printing process used, with certain printing processes having high resolutions and others having low resolutions. Thicknesses of the layers can be uniform or may vary, and average thicknesses of the layers can be the same or different. Average thickness is generally associated with thickness of the layer immediately after printing. In various embodiments, the layers independently have an average thickness of from about 1 to about 10,000, about 2 to about 1,000, about 5 to about 750, about 10 to about 500, about 25 to about 250, or about 50 to 100, μm.

Thinner and thicker thicknesses are also contemplated. This disclosure is not limited to any particular dimensions of any of the layers.

Optionally, step II) can be repeated for any additional layer(s) to form the 3D article. If step II) is repeated, independently selected thermoplastic silicone compositions may be utilized in connection with each subsequent layer, which may be the same as or different from the first and/or second thermoplastic silicone compositions, as described below. The total number of layers required will depend, for example, on the size and shape of the 3D article, as well as dimensions of the individual and collective layers. One of ordinary skill can readily determine how many layers are required or desired using conventional techniques, such as 3D scanning, rendering, modeling (e.g. parametric and/or vector based modeling), sculpting, designing, slicing, manufacturing and/or printing software. In certain embodiments, once the 3D article is in a final solidified state, the individual layers are generally not identifiable and the 3D article has a continuous and desirable aesthetic. In other embodiments, the layers may be distinct from one another, which may have a desirable aesthetic for other end use applications of the 3D article. Each printing step is independently selected with regard to the particular thermoplastic silicone composition, the 3D printer utilized, process parameters, etc.

If desired, inserts, which may have varying shape, dimension, and be comprised of any suitable material, may be disposed or placed on or at least partially in any layer during the inventive method. For example, an insert may be utilized in between subsequent printing steps, and the insert may become integral with the 3D article upon its formation. Alternatively, the insert may be removed at any step during the inventive method, e.g. to leave a cavity or for other functional or aesthetic purposes. The use of such inserts may provide better aesthetics and economics over relying on printing alone.

In various embodiments, the 3D printer is selected from a fused filament fabrication printer, a selective laser sintering printer, a selective laser melting printer, a stereolithography printer, a powder bed (binder jet) printer, a material jet printer, a direct metal laser sintering printer, an electron beam melting printer, a laminated object manufacturing deposition printer, a directed energy deposition printer, a laser powder forming printer, a polyjet printer, an ink-jetting printer, a material jetting printer, and a syringe extrusion printer. The 3D printer may be independently selected during each printing step associated with the inventive method. Said differently, if desired, each printing step may utilize a different 3D printer. Different 3D printers may be utilized to impart different characteristics with respect to the layers, and different 3D printers may be particularly well suited for different types of thermoplastic silicone compositions.

This disclosure generally incorporates ASTM Designation F2792-12a, "Standard Terminology for Additive Manufacturing Technologies," by reference in its entirety. Under this ASTM standard, "3D printer" is defined as "a machine used for 3D printing" and "3D printing" is defined as "the fabrication of objects through the deposition of a material using a print head, nozzle, or another printer technology." "Additive manufacturing (AM)" is defined as "a process of joining materials to make objects from 3D model data, usually layer upon layer, as opposed to subtractive manufacturing methodologies. Synonyms associated with and encompassed by 3D printing include additive fabrication, additive processes, additive techniques, additive layer manufacturing, layer manufacturing, and freeform fabrication." AM may also be referred to as rapid prototyping (RP). As used herein, "3D printing" is generally interchangeable with "additive manufacturing" and vice versa.

The method of this disclosure can mimic any one of the aforementioned 3D printing processes, or other 3D printing processes understood in the art. Specific examples of suitable 3D printing processes are also described in U.S. Pat. Nos. 5,204,055 and 5,387,380, the disclosures of which are incorporated by reference.

3D printing is generally associated with a host of related technologies used to fabricate physical objects from computer generated data sources. Some of these specific processes are included above with reference to specific 3D printers. Further, some of these processes, and others, are described in greater detail below.

In general, all 3D printing processes have a common starting point, which is a computer generated data source or program which may describe an object. The computer generated data source or program can be based on an actual or virtual object. For example, an actual object can be scanned using a 3D scanner and scan data can be used to make the computer generated data source or program. Alternatively, the computer generated data source or program may be designed from scratch.

The computer generated data source or program is typically converted into a standard tessellation language (STL) file format; however, other file formats can also or additionally be used. The file is generally read into 3D printing software, which takes the file and optionally user input to separate it into hundreds, thousands, or even millions of "slices." The 3D printing software typically outputs machine instructions, which may be in the form of G-code, which is read by the 3D printer to build each slice. The machine instructions are transferred to the 3D printer, which then builds the object—layer by layer—based on this slice information in the form of machine instructions. Thicknesses of these slices may vary.

Regardless of the particular 3D printer and 3D printing process utilized in the method, ambient conditions may be manipulated or controlled. For example, if desired, the substrate may be heated before, during, and/or after the steps of printing. Further, the substrate could be moved, e.g. rotated, during any printing step. Typically, the 3D printer utilizes a dispenser, e.g. a nozzle or printhead, for providing the particular thermoplastic silicone composition. The dispenser may be heated before, during, and after dispensing the particular thermoplastic silicone composition. More than one dispenser may be utilized with each dispenser having independently selected properties. The method may be carried out in a heated or cooled environment such that solidification may be selectively accelerated or delayed.

In various embodiments, the method of this disclosure mimics a conventional material extrusion process. Material extrusion generally works by extruding material through a nozzle to print one cross-section of an object, which may be repeated for each subsequent layer. In the method, and unlike conventional processes, the material comprises the first and/or second thermoplastic silicone compositions of this disclosure. The nozzle may be heated to contribute to flowability and elevated temperature of the particular thermoplastic silicone composition in each of the printing steps. Heating of the nozzle may also aid in dispensing the particular thermoplastic silicone composition. A conventional extruder, e.g. a single or twin screw extruder, may be utilized to heat the particular thermoplastic silicone composition, which may subsequently feed the particular thermoplastic silicone composition to a 3D printer which is in communication with the conventional extruder.

With this process, the material, i.e., first and/or second thermoplastic silicone compositions, is typically in the form of a slurry, gel, or paste during extrusion. The extruded material may be heated to form the at least partially solidified layer. Repeating this process builds upon an object one layer at a time to ultimately form the 3D article. In certain embodiments, utilizing thinner cross-sections provides aesthetic and/or performance advantages with respect to the 3D article.

The nozzle and/or build platform generally moves in the X-Y (horizontal) plane before moving in the Z-axis (vertical) plane once each layer is complete. In this way, the object which becomes the 3D article is built one layer at a time from the bottom upwards. This process can use material for two different purposes, building the object and supporting overhangs in order to avoid extruding material into thin air.

In various embodiments, the method of this disclosure mimics a conventional material jetting process. Material jetting printers often resemble traditional paper printers, e.g. inkjet printers. In material jetting, a print head moves around a print area jetting the particular thermoplastic silicone composition. Repeating this process builds up the object which results in the 3D article one layer at a time.

Optionally, the resulting objects may be subjected to different post-processing regimes, such as heating, infiltration, bakeout, and/or firing. This may be done, for example, to expedite cure of any binder, to reinforce the 3D article, eliminate any curing/cured binder (e.g., by decomposition), to consolidate the core material (e.g., by sintering/melting), and/or to form a composite material blending the properties of any powder and/or binder.

Composition

The first and second thermoplastic silicone compositions may be the same as or different from one another, and when step II) is repeated, independently selected thermoplastic silicone compositions may be utilized. For purposes of brevity, the first and second thermoplastic silicone composition, along with any other thermoplastic silicone compositions optionally utilized when step II) is repeated, are referred to below collectively merely as "the thermoplastic silicone composition," "each of the thermoplastic silicone compositions," or "at least one of the thermoplastic silicone compositions." Reference to such terms or phrases may refer to any of the thermoplastic silicone compositions utilized in the method, and despite being referred to collectively, each of the thermoplastic silicone compositions may be independently selected.

The thermoplastic silicone composition may be any composition that is thermoplastic and which comprises a silicone. The thermoplastic silicone composition may comprise the silicone as a major component or as a minor component. The silicone can be utilized in combination with other optional components in the thermoplastic silicone composition, including organics. For example, the thermoplastic silicone composition may be an organic-silicone hybrid or copolymer, or may comprise a combination of silicone and organics to selectively modify properties, such as thermoplastic material flow during the step of printing with the 3D printer. For example, modifying relative amounts of components in the thermoplastic silicone composition may impact processing window and flow characteristics, e.g. viscosity, during printing.

Specific examples of thermoplastic silicone compositions suitable for the inventive method are disclosed below. In various embodiments, each of the thermoplastic silicone compositions is selected from those described below.

For example, examples of thermoplastic silicone compositions suitable for the inventive method include silicone hot melt compositions, thermoplastic silicone vulcanizate compositions (e.g. compositions comprising a silicone elastomer dispersed in a thermoplastic polymer), and non-crosslinked or substantially non-crosslinked thermoplastic silicone polymer compositions (which may comprise homopolymers, copolymers, silicone-organic copolymers, etc.).

In certain embodiments, at least one of the thermoplastic silicone compositions comprises the silicone hot melt composition. Silicone hot melt compositions may be curable or noncurable. Hot melt compositions are known in the art. In particular, hot melt compositions are commonly solid at room temperature, but due to thermoplastic properties, hot melt compositions melt and become flowable at elevated temperatures, and harden once cooled. In various embodiments, the silicone hot melt compositions are non-curable. However, if desired, e.g. for improved bond strength, the silicone hot melt compositions may undergo some curing during and/or after solidification, e.g. via atmospheric moisture or by irradiation.

One specific example of a silicone hot melt composition comprises: (i) a silicone fluid and/or an organopolysiloxane; (ii) a silicone resin and/or an organopolysiloxane; or (iii) both (i) and (ii).

Silicone fluids are known in the art and are typically linear silicone polymers having a viscosity in the range of fluids. One common example of a silicone fluid is a polydiorganopolysiloxane. The silicone fluid may have functional groups at terminal and/or pendent locations, or may be free from functional groups. Functional groups are those which are utilized for further reaction or curing, and thus are distinguished from various organic groups, e.g. alkyl groups, which are generally inert absent specific curing conditions or catalysts. One example of a functional group is a silicon-bonded hydroxyl group, which may condense with other silicon-bonded hydroxyl groups to give siloxane bonds with water as a byproduct. Generally, silicone fluids comprise repeating D units capped with M units.

Organopolysiloxanes may be linear, branched, cyclic, or resinous. In particular, the organopolysiloxane may comprise any combination of M, D, T, and Q units. The symbols M, D, T, and Q represent the functionality of structural units of organopolysiloxanes. M represents the monofunctional unit $R^0{}_3SiO_{1/2}$. D represents the difunctional unit $R^0{}_2SiO_{2/2}$. T represents the trifunctional unit $R^0SiO_{3/2}$. Q represents the tetrafunctional unit $SiO_{4/2}$. Generic structural formulas of these units are shown below:

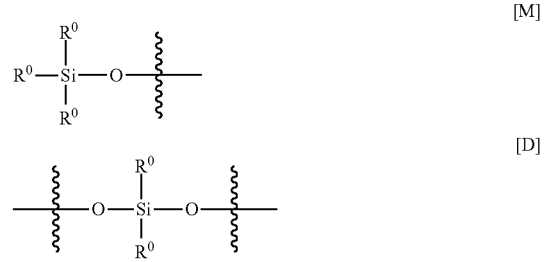

-continued

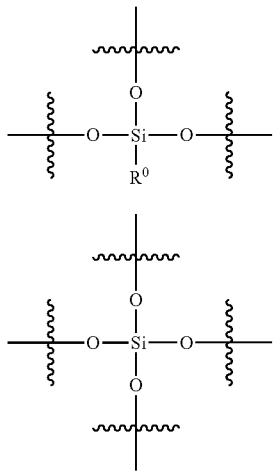

In these structures/formulae, each $R^0$ may be any hydrocarbon, aromatic, aliphatic, alkyl, alkenyl, or alkynl group.

The silicone resin has a three-dimensional network attributable to the presence of T and/or Q units. In certain embodiments, the silicone resin comprises T and/or Q units in combination with M and/or D units. When the organopolysiloxane (A) and/or organosilicon compound (B) comprises a silicone resin, the silicone resin may be a DT resin, an MT resin, an MDT resin, a DTQ resin, an MTQ resin, an MDTQ resin, a DQ resin, an MQ resin, a DTQ resin, an MTQ resin, or an MDQ resin. Generally, when the hydrosilylation-curable silicone composition comprises a resin, the layer(s) and resulting 3D article have increased rigidity.

In a specific embodiment, the silicone resin has the general formula:

wherein each $R^1$ is an independently selected hydrocarbyl group, which may be substituted or unsubstituted, and each $R^2$ is independently selected from $R^1$ and hydroxyl, and w, x, y, and z are mole fractions such that w+x+y+z=1. As understood in the art, for linear organopolysiloxanes, subscripts y and z are generally 0, whereas for resins, subscripts y and/or z>0. Various alternative embodiments are described below with reference to w, x, y and z. In these embodiments, the subscript w may have a value of from 0 to 0.9999, alternatively from 0 to 0.999, alternatively from 0 to 0.99, alternatively from 0 to 0.9, alternatively from 0.9 to 0.999, alternatively from 0.9 to 0.999, alternatively from 0.8 to 0.99, alternatively from 0.6 to 0.99. The subscript x typically has a value of from 0 to 0.9, alternatively from 0 to 0.45, alternatively from 0 to 0.25. The subscript y typically has a value of from 0 to 0.99, alternatively from 0.25 to 0.8, alternatively from 0.5 to 0.8. The subscript z typically has a value of from 0 to 0.99, alternatively from 0 to 0.85, alternatively from 0.85 to 0.95, alternatively from 0.6 to 0.85, alternatively from 0.4 to 0.65, alternatively from 0.2 to 0.5, alternatively from 0.1 to 0.45, alternatively from 0 to 0.25, alternatively from 0 to 0.15.

In certain embodiments, each $R^1$ is a $C_1$ to $C_{10}$ hydrocarbyl group, which may be substituted or unsubstituted, and which may include heteroatoms within the hydrocarbyl group, such as oxygen, nitrogen, sulfur, etc. Acyclic hydrocarbyl and halogen-substituted hydrocarbyl groups containing at least three carbon atoms can have a branched or unbranched structure. Examples of hydrocarbyl groups represented by $R^1$ include, but are not limited to, alkyl groups, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, octyl, nonyl, and decyl; cycloalkyl groups, such as cyclopentyl, cyclohexyl, and methylcyclohexyl; aryl groups, such as phenyl and naphthyl; alkaryl groups, such as tolyl and xylyl; and aralkyl groups, such as benzyl and phenethyl. Examples of halogen-substituted hydrocarbyl groups represented by $R^1$ include, but are not limited to, 3,3,3-trifluoropropyl, 3-chloropropyl, chlorophenyl, dichlorophenyl, 2,2,2-trifluoroethyl, 2,2,3,3-tetrafluoropropyl, and 2,2,3,3,4,4,5,5-octafluoropentyl.

The selection of the silicone fluid, organopolysiloxane, and/or silicone resin is based on desired properties of the 3D article and layers during the inventive method. For example, it may be desirable for the layers to be in the form of an elastomer, a gel, a resin, etc., and selecting the components allows one of skill in the art to achieve a range of desirable properties.

When the hot melt composition is curable, at least one of the silicone fluid, the silicone resin, and/or the organopolysiloxane typically includes silicon-bonded curable groups, e.g. silicon-bonded hydroxyl groups. For example, for the silicone resin of general formula (I), at least one, alternatively at least two, of $R^2$ are hydroxyl.

Additional and specific examples of hot melt compositions suitable for the inventive method are disclosed in U.S. Pat. No. 8,093,333, which is incorporated by reference herein in its entirety. Additional and specific examples of hot melt compositions which are curable and suitable for the inventive method are disclosed in International (PCT) Publ. No. WO2014/124389, which is incorporated by reference herein in its entirety.

In certain embodiments, at least one of the thermoplastic silicone compositions comprises the thermoplastic silicone vulcanizate composition.

Typically, the thermoplastic silicone vulcanizate composition comprises (A) a thermoplastic polymer and (B) a silicone elastomer dispersed in the thermoplastic polymer (A). The term "vulcanizate" references (B) the silicone elastomer dispersed in the thermoplastic polymer (A). As understood in the art, vulcanization of silicones need not involve sulfur, unlike vulcanization of conventional rubbers. In various embodiments, the thermoplastic silicone vulcanizate composition is re-processable. By reprocessable, it is meant that the thermoplastic silicone vulcanizate composition can be reheated to be melt-processable more than once, as distinguished from conventional vulcanizates. This reprocessability is particularly advantageous as compared to conventional vulcanizates because reprocessability allows for recycling of material and reduction of scrap.

The silicone elastomer (B) is generally in the form of particles dispersed throughout the thermoplastic polymer (A). The particles may be continuous or discontinuous, although the particles are generally discontinuous and the thermoplastic polymer (A) is typically continuous. The particles may be of varying size and shape. Generally, crosslinked silicones, e.g. rubbers and elastomers, are not thermoplastics. However, the thermoplastic silicone vulcanizate composition relies on the thermoplastic properties of the thermoplastic polymer (A) in combination with the desirable properties of the silicone elastomer (B), which is advantageous.

In one embodiment, the silicone elastomer (B) comprises the vulcanized product of (B1) an organopolysiloxane having an average of at least two silicon-bonded alkenyl groups per molecule; (B2) an organosilicon compound having an average of at least two silicon-bonded hydrogen atoms per molecule; and (C) a hydrosilylation catalyst. The vulcanized product may alternatively be referred to as a hydrosilylation-reaction product.

The organopolysiloxane (B1) and the organosilicon compound (B2) may independently be linear, branched, cyclic, or resinous. In particular, the organopolysiloxane (B1) and the organosilicon compound (B2) may independently comprise any combination of M, D, T, and Q units.

For example, in certain embodiments, one of the organopolysiloxane (B1) and the organosilicon compound (B2) comprises a silicone resin, which typically comprises T and/or Q units in combination with M and/or D units. When the organopolysiloxane (B1) and/or organosilicon compound (B2) comprises a silicone resin, the silicone resin may be a DT resin, an MT resin, an MDT resin, a DTQ resin, an MTQ resin, an MDTQ resin, a DQ resin, an MQ resin, a DTQ resin, an MTQ resin, or an MDQ resin.

Alternatively, because the silicone elastomer (B) is advantageously elastomeric, in other embodiments, the organopolysiloxane (B1) and/or the organosilicon compound (B2) is an organopolysiloxane comprising repeating D units. Such organopolysiloxanes are substantially linear but may include some branching attributable to T and/or Q units. Alternatively, such organopolysiloxanes are linear. In one embodiment, the organopolysiloxane (B1) is a substantially linear or linear diorganopolysiloxane.

The silicon-bonded alkenyl groups and silicon-bonded hydrogen atoms of the organopolysiloxane (B1) and the organosilicon compound (B2), respectively, may independently be pendent, terminal, or in both positions.

In a specific embodiment, the organopolysiloxane (B1) has the general formula:

$$(R^1R^3{}_2SiO_{1/2})_{w'}(R^3{}_2SiO_{2/2})_{x'}(R^3SiO_{3/2})_{y'}(SiO_{4/2})_{z'},\quad (II)$$

wherein each $R^1$ is defined above, and each $R^3$ is independently selected from $R^1$ and an alkenyl group, with the proviso that at least two of $R^3$ are alkenyl groups, and w', x', y', and z' are mole fractions such that w'+x'+y'+z'=1. As understood in the art, for linear organopolysiloxanes, subscripts y' and z' are generally 0, whereas for resins, subscripts y' and/or z'>0. Various alternative embodiments are described below with reference to w', x', y' and z'. In these embodiments, the subscript w' may have a value of from 0 to 0.9999, alternatively from 0 to 0.999, alternatively from 0 to 0.99, alternatively from 0 to 0.9, alternatively from 0.9 to 0.999, alternatively from 0.9 to 0.999, alternatively from 0.8 to 0.99, alternatively from 0.6 to 0.99. The subscript x' typically has a value of from 0 to 0.9, alternatively from 0 to 0.45, alternatively from 0 to 0.25. The subscript y' typically has a value of from 0 to 0.99, alternatively from 0.25 to 0.8, alternatively from 0.5 to 0.8. The subscript z' typically has a value of from 0 to 0.99, alternatively from 0 to 0.85, alternatively from 0.85 to 0.95, alternatively from 0.6 to 0.85, alternatively from 0.4 to 0.65, alternatively from 0.2 to 0.5, alternatively from 0.1 to 0.45, alternatively from 0 to 0.25, alternatively from 0 to 0.15.

The alkenyl groups represented by $R^3$, which may be the same or different within the organopolysiloxane (B1), typically have from 2 to 10 carbon atoms, alternatively from 2 to 6 carbon atoms, and are exemplified by, for example, vinyl, allyl, butenyl, hexenyl, and octenyl.

In these embodiments, the organosilicon compound (B2) may be further defined as an organohydrogensilane, an organohydrogensiloxane, or a combination thereof. The structure of the organosilicon compound (B2) can be linear, branched, cyclic, or resinous.

In acyclic polysilanes and polysiloxanes, the silicon-bonded hydrogen atoms can be located at terminal, pendant, or at both terminal and pendant positions. Cyclosilanes and cyclosiloxanes typically have from 3 to 12 silicon atoms, alternatively from 3 to 10 silicon atoms, alternatively from 3 to 4 silicon atoms. The organohydrogensilane can be a monosilane, disilane, trisilane, or polysilane.

Hydrosilylation catalyst (C) includes at least one hydrosilylation catalyst that promotes the reaction between the organopolysiloxane (B1) and the organosilicon compound (B2). The hydrosilylation catalyst (C) can be any of the well-known hydrosilylation catalysts comprising a platinum group metal (i.e., platinum, rhodium, ruthenium, palladium, osmium and iridium) or a compound containing a platinum group metal. Typically, the platinum group metal is platinum, based on its high activity in hydrosilylation reactions.

Specific hydrosilylation catalysts suitable for (C) include the complexes of chloroplatinic acid and certain vinyl-containing organosiloxanes disclosed by Willing in U.S. Pat. No. 3,419,593, the portions of which address hydrosilylation catalysts are hereby incorporated by reference. A catalyst of this type is the reaction product of chloroplatinic acid and 1,3-diethenyl-1,1,3,3-tetramethyldisiloxane.

The hydrosilylation catalyst (C) can also be a supported hydrosilylation catalyst comprising a solid support having a platinum group metal on the surface thereof. A supported catalyst can be conveniently separated from organopolysiloxanes, for example, by filtering the reaction mixture. Examples of supported catalysts include, but are not limited to, platinum on carbon, palladium on carbon, ruthenium on carbon, rhodium on carbon, platinum on silica, palladium on silica, platinum on alumina, palladium on alumina, and ruthenium on alumina.

In addition or alternatively, the hydrosilylation catalyst (C) can also be a microencapsulated platinum group metal-containing catalyst comprising a platinum group metal encapsulated in a thermoplastic resin. Hydrosilylation-curable silicone compositions including microencapsulated hydrosilylation catalysts are stable for extended periods of time, typically several months or longer, under ambient conditions, yet cure relatively rapidly at temperatures above the melting or softening point of the thermoplastic resin(s). Microencapsulated hydrosilylation catalysts and methods of preparing them are well known in the art, as exemplified in U.S. Pat. No. 4,766,176 and the references cited therein, and U.S. Pat. No. 5,017,654. The hydrosilylation catalyst (C) can be a single catalyst or a mixture comprising two or more different catalysts that differ in at least one property, such as structure, form, platinum group metal, complexing ligand, and thermoplastic resin.

The concentration of the hydrosilylation catalyst (C) is sufficient to catalyze the addition reaction between the organopolysiloxane (B1) and the organosilicon compound (B2). In certain embodiments, the concentration of the hydrosilylation catalyst (C) is sufficient to provide typically from 0.1 to 1000 ppm of platinum group metal, alternatively from 0.5 to 100 ppm of platinum group metal, alternatively from 1 to 25 ppm of platinum group metal, based on the combined weight of the organopolysiloxane (B1) and the organosilicon compound (B2).

In one specific embodiment the silicone elastomer (B) comprises the vulcanized product of ViMe$_2$SiO(Me$_2$SiO)$_{156}$(ViMeSiO)$_5$SiMe$_2$Vi as the organopolysiloxane (B1), Me$_3$SiO(Me$_2$SiO)$_{14}$(MeHSiO)$_{16}$SiMe$_3$ as the organosilicon compound (B2) and a complex of platinum with divinyltetramethyldisiloxane as (C) such that platinum is present in a concentration of 5 ppm based on (B1), (B2) and (C).

As noted above, the silicone elastomer (B) is dispersed in the thermoplastic polymer (A). The thermoplastic polymer (A) is a host matrix for the silicone elastomer (B). The thermoplastic polymer (A) may be any thermoplastic polymer (A) suitable for hosting the silicone elastomer (B).

The thermoplastic polymer (A) may be organic, silicone-based, or both. However, the thermoplastic polymer is typically organic.

In various embodiments, the thermoplastic polymer (A) is elastomeric. In these embodiments, the thermoplastic polymer (A) may be a block copolymer comprising "hard" segments which have a melting point or glass transition temperature ($T_g$) above room temperature and "soft" segments which have a melting point or glass transition temperature ($T_g$) below room temperature. In these embodiments, the "hard" segments of the block copolymer typically aggregate to form distinct microphases in the block copolymer and additionally act as physical crosslinks relative to the "soft" segments. This imparts a rubbery and desirable feel by a user. At elevated temperatures, the "hard" segments melt, such that the block copolymer is melt processable.

Alternatively, because the silicone elastomer (B) imparts elastomeric properties to the thermoplastic silicone vulcanizate composition, the thermoplastic polymer (A) need not be elastomeric itself. For example, the thermoplastic polymer (A) may be mixed with the silicone elastomer (B) to give the thermoplastic silicone vulcanizate composition.

When the thermoplastic polymer (A) is organic, the thermoplastic polymer (A) may be selected from a polyurethane, a polyurea, a polyamide, a polyimide, a polyketone, a polyester, a polyether, a polyoxide, a polyamine, a polysilylene, a polyetherimide, a polyetherketone, a polyacrylate, a polysulfide, a polythiophene, a polyphosphazene, a polyphenylene, a polyoxazole, a polythiazole, a polyimidazole, a polybenzoxazine, a polybenzothiazole, a polycarborane, a polysulfone, a polyanhydride, a polysulfonamide, a polycarbohydrate, a polycarbonate, a polyacetal, a polyolefin, a polyvinyl, a polyvinylidiene, a polyvinylchloride, a polyaromatic, a polydiene, a polydiyne, a polypeptide, a polyamide-polyether, a styrenic block copolymer, an ionomer, poly(ethylene-vinyl acetate), an acrylonitrile butadiene styrene, and copolymers thereof.

In other embodiments, the thermoplastic polymer (A) is a rubber, which is typically a diene elastomer. Diene elastomer means a polymer having elastic properties at room temperature, mixing temperature or at the usage temperature, which can be polymerized from a diene monomer. Typically, a diene elastomer is a polymer containing at least one ene (carbon-carbon double bond. C=C) having a hydrogen atom on the alpha carbon next to the C=C bond. The diene elastomer can be a natural polymer such as natural rubber or can be a synthetic polymer derived at least in part from a diene.

The diene elastomer can be natural rubber. The diene elastomer can alternatively be a synthetic polymer which is a homopolymer or copolymer of a diene monomer (a monomer bearing two double carbon-carbon bonds, whether conjugated or not).

Preferably the elastomer is an "essentially unsaturated" diene elastomer, which is a diene elastomer resulting at least in part from conjugated diene monomers, having a content of members or units of diene origin (conjugated dienes) which is greater than 15 mol %. Alternatively, it is a "highly unsaturated" diene elastomer having a content of units of diene origin (conjugated dienes) which is greater than 50 mol %. Diene elastomers such as butyl rubbers, copolymers of dienes and elastomers of alpha-olefins of the ethylene-propylene diene monomer (EPDM) type, which may be described as "essentially saturated" diene elastomers having a low (less than 15 mol %) content of units of diene origin, can alternatively be used.

Suitable conjugated dienes include, for example, 1,3-butadiene, 2-methyl-1,3-butadiene, 2,3-di($CrC_5$ alkyl)-1,3-butadienes such as, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene. Suitable vinyl-aromatic compounds are, for example, styrene, ortho-, meta- and para-methylstyrene, the commercial mixture "vinyltoluene," para-tert-butylstyrene, methoxystyrenes, chlorostyrenes, vinylmesitylene, divinylbenzene, and vinylnaphthalene Methods of dispersing silicone elastomers in thermoplastic polymers are known in the art. For example, one method is disclosed in U.S. Pat. No. 5,844,031, which is incorporated by reference herein in its entirety. Another method is disclosed in PCT Publication WO2014/044759, which is incorporated by reference herein in its entirety.

For example, the thermoplastic silicone vulcanizate composition may be formed via a process referred to as dynamic vulcanization. For example, in dynamic vulcanization, when the vulcanized product is formed from (B1) the organopolysiloxane having an average of at least two silicon-bonded alkenyl groups per molecule, (B2) the organosilicon compound having an average of at least two silicon-bonded hydrogen atoms per molecule, and (C) the hydrosilylation catalyst, these components may be mixed together with the thermoplastic polymer (A) and the vulcanized product is formed by reacting the components during mixing. The relative amounts of the components and the silicone elastomer (B) to thermoplastic polymer (A) may vary based on desired properties.

In one specific embodiment, the thermoplastic polymer (A) is a thermoplastic polyurethane (TPU). TPU is an elastomeric polyurethane having thermoplastic properties, and often comprises linear segmented block copolymers comprising hard and soft segments.

Certain thermoplastic silicone vulcanizate compositions are commercially available. For example, certain thermoplastic silicone vulcanizate compositions are commercially available from Multibase of Copley, Ohio. Multibase is a Dow Corning Company. Thermoplastic silicone vulcanizate compositions are available under the trade name TPSiV®.

In certain embodiments, at least one of the thermoplastic silicone compositions comprises a thermoplastic silicone polymer composition. As introduced above, the thermoplastic silicone polymer composition may comprise homopolymers, copolymers, silicone-organic copolymers, etc.).

When the thermoplastic silicone polymer composition comprises a copolymer, specific examples of suitable copolymers include a poly(dimethylsiloxane-co-diphenylsiloxane), a polysilphenylene, a poly(silphenylene-dimethylsiloxane), a poly(phenylmethylsiloxane-co-diphenylsiloxane), a silicone-polyurethane copolymer, a silicone-polyamide copolymer, a silicone-polyetherimide copolymer, a silicone-polysulfone copolymer, a silicone-polyester copolymer, a silicone-polycarbonate copolymer, a silicone-polyetherketone copolymer, a silicone-polyacrylate copolymer, a silicone-polyvinyl copolymer, a silicone-polyurea copolymer, a silicone-polyphenlyene copolymer, a silicone-polysulfide copolymer, a silicone-polyether copolymer, a silicone-polyphosphazene copolymer, a silicone-polycarbohydrate copolymer or sugar siloxane, a silicone-polyolefin copolymer or silicone wax, a silicone-polypeptide copolymer, and a silicone-polycarborane copolymer. Combinations of different copolymers may be utilized. Such copolymers are known in the art and can be synthesized or obtained commercially.

Any of the thermoplastic silicone compositions may optionally and independently further comprise additional ingredients or components, especially if the ingredient or component does not inhibit thermoplastic properties of the thermoplastic silicone compositions or flowability thereof (e.g. at elevated temperatures). Examples of additional ingredients include, but are not limited to, inhibitors; adhesion promoters; dyes; pigments; anti-oxidants; carrier vehicles; heat stabilizers; flame retardants; thixotroping agents; flow control additives; fillers, including extending and reinforcing fillers; and cross-linking agents.

In certain embodiments, the thermoplastic silicone compositions are shear thinning. Compositions with shear thinning properties may be referred to as psuedoplastics. As understood in the art, compositions with shear thinning properties are characterized by having a viscosity which decreases upon an increased rate of shear strain. Said differently, viscosity and shear strain are inversely proportional for shear thinning compositions. When the thermoplastic silicone compositions are shear thinning, the thermoplastic silicone compositions are particularly well suited for printing, especially when a nozzle or other dispense mechanism is utilized.

Any of the thermoplastic silicone compositions described above may be a single part or a multi-part composition, as described above with reference to certain thermoplastic silicone compositions. The multi-part composition may be, for example, a two-part system, a three-part system, etc. contingent on the selection of the thermoplastic silicone composition and the components thereof. However, because the thermoplastic silicone compositions are thermoplastics, multi-part compositions to prevent premature curing are generally not required.

In certain embodiments, when the thermoplastic silicone compositions are multi-part thermoplastic silicone compositions, the separate parts of the multi-part thermoplastic silicone composition may be mixed in a dispense printing nozzle, e.g. a dual dispense printing nozzle, prior to and/or during printing. Alternatively, the separate parts may be combined immediately prior to printing. Alternatively still, the separate parts may be combined after exiting the dispense printing nozzle, e.g. by crossing printing streams or by mixing the separate parts as the layers are formed.

The thermoplastic silicone compositions can be of various viscosities at processing or printing temperatures. In certain embodiments, the composition has a viscosity less than 500, less than 250, or less than 100, centistokes at 150° C., alternatively a viscosity of from 1 to 1,000,000 centistokes at 150° C., alternatively from 1 to 100,000 centistokes at 150° C., alternatively from 1 to 10,000 centistokes at 150° C. Viscosity of the thermoplastic silicone compositions can be changed by altering the amounts and/or molecular weight of one or more components. As readily understood in the art, kinematic viscosity may be measured in accordance with ASTM D-445 (2011), entitled "Standard Test Method for Kinematic Viscosity of Transparent and Opaque Liquids (and Calculation of Dynamic Viscosity)."

A 3D article is formed in accordance with the method. Specifically, the 3D article can be formed with the thermoplastic silicone compositions and as described above with the inventive method. The 3D article can be of various sizes and shapes and is not limited.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims. Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The following examples, illustrating compositions and their reaction products, are intended to illustrate and not to limit the invention.

Thermoplastic silicone compositions are printed via a 3D printer in accordance with this disclosure.

Examples 1-3 and Comparative Examples 1-2

Thermoplastic silicone compositions are obtained and extruded through a single screw extruder to give filaments. The filaments are utilized to feed the 3D printer.

Thermoplastic silicone composition 1 is commercially available under the tradename MultiflexO SiE 9310 from Multibase of Copley, Ohio. Multibase is a Dow Corning Company. Thermoplastic silicone composition 2 is commercially available under the tradename MultiflexOTES 8008 from Multibase.

Example 1

The thermoplastic silicone composition 1 is extruded through a single screw extruder to provide filaments having a diameter of from 1.58 to 1.73 mm. These filaments are fed into a 3D printer and wishbone samples of smooth surface quality and complete infill are printed to give a 3D article. In particular, the 3D printer utilized is a MakerBot Replicator 2×3D printer, commercially available from MakerBot Industries of NY, N.Y., which utilizes MakerWare software. The 3D article is formed on a build plate and transferred to an Instron frame. The 3D printer utilized a standard ABS profile, except temperature was raised to 235° C., retraction is set to 0, and print speed is decreased to 25 mm/sec.

Physical properties of the 3D article are measured. The 3D article formed in Example 1 has a tensile strength of 7.488±0.172 MPa and an elongation at break of the printed sample is 88.4±42.7%. These properties are measured in accordance with ISO 527-MOLDED-TENSILE-500 mm per minute.

Comparative Example 1

The thermoplastic silicone composition 1 is disposed in an injection mold and cured to give an article having the same composition and dimensions of the 3D article formed in Example 1. Physical properties of the article are measured as in Example 1. The article formed in Comparative Example 1 has a tensile strength of 10.903±0.187 MPa and an elongation at break of the printed sample is 215.4±20.5% when measured in accordance with ISO 527. As such, it is clear that the inventive printing process of the subject disclosure can quickly and conveniently create 3D articles in the absence of a conventional mold, and that such 3D articles having excellent physical properties comparable to articles formed in conventional molds which additionally undergo pressurization during curing, thus contributing to mechanical properties.

Example 2

The process of Example 1 is repeated but with the thermoplastic silicone composition 2 to provide filaments having a diameter of from 1.65 to 1.75 mm. Physical properties of the 3D article are measured as in Example 1.

The 3D article formed in Example 2 has a tensile strength of 4.755±0.155 MPa and an elongation at break of the printed sample is 339.0±38.5% when measured in accordance with ISO 527.

Comparative Example 2

The thermoplastic silicone composition 2 is disposed in an injection mold and cured to give an article having the same composition and dimensions of the 3D article formed in Example 2. Physical properties of the article are measured as in Example 1. The article formed in Comparative Example 2 has a tensile strength of 7.312±0.097 MPa and an elongation at break of the printed sample is 376.8±6.7% when measured in accordance with ISO 527. As such, it is clear that the inventive printing process of the subject disclosure can quickly and conveniently create 3D articles in the absence of a conventional mold, and that such 3D articles having excellent physical properties comparable to articles formed in conventional molds which additionally undergo pressurization during curing, thus contributing to mechanical properties.

Example 3

An additional filament formed in Example 2 is utilized to print an alternative 3D article having a complex shape and configuration in accordance with the process of Example 1. The 3D article has an excellent aesthetic and complex appearance.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A method of forming a three-dimensional (3D) article, said method comprising:
   I) printing a first thermoplastic silicone composition with a 3D printer to form an at least partially solidified layer;
   II) printing a second thermoplastic silicone composition on the at least partially solidified layer with the 3D printer to form a subsequent at least partially solidified layer; and
   III) optionally, repeating step II) with independently selected thermoplastic silicone composition(s) for any additional layer(s) to form the 3D article;
       wherein the first and second thermoplastic silicone compositions are the same as or different from one another;
       wherein the first and/or second thermoplastic silicone compositions comprises a thermoplastic silicone polymer composition, and wherein the thermoplastic silicone polymer composition comprises a silicone copolymer selected from a poly(dimethylsiloxane-co-diphenylsiloxane), a polysilphenylene, a poly(silphenylene-dimethylsiloxane), a poly(phenylmethylsiloxane-co-diphenylsiloxane), a silicone-polyurethane copolymer, a silicone-polyetherimide copolymer, a silicone-polysulfone copolymer, a silicone-polyester copolymer, a silicone-polycarbonate copolymer, a silicone-polyetherketone copolymer, a silicone-polyacrylate copolymer, a silicone-polyurea copolymer, a silicone-polyphenylene copolymer, a silicone-polysulfide copolymer, a silicone-polyether copolymer, a silicone-polyphosphazene copolymer, a silicone-polycarbohydrate copolymer or sugar siloxane, and a silicone-polyolefin copolymer or silicone wax, a silicone-polypeptide copolymer; or
       wherein the first and/or second thermoplastic silicone compositions comprises a silicone hot melt composition; or
       wherein the first and/or second thermoplastic silicone compositions comprises a thermoplastic silicone vulcanizate composition.

2. The method according to claim 1, wherein the first and second thermoplastic silicone compositions are the same.

3. The method according to claim 1, wherein the first and/or second thermoplastic silicone compositions comprises the silicone hot melt composition, wherein the silicone hot melt composition is noncurable, and wherein the silicone hot melt composition comprises: i) a silicone fluid and/or an organopolysiloxane; ii) a silicone resin and/or an organopolysiloxane; or iii) both i) and ii).

4. The method according to claim 1, wherein the first and/or second thermoplastic silicone compositions comprises the silicone hot melt composition, wherein the silicone hot melt composition is curable, and wherein the silicone hot melt composition comprises a moisture-curable composition.

5. The method according to claim 1, wherein the first and/or second thermoplastic silicone compositions comprises the thermoplastic silicone vulcanizate composition, and wherein the thermoplastic silicone vulcanizate composition comprises (A) a thermoplastic polymer and (B) a silicone elastomer dispersed in the thermoplastic polymer (A).

6. The method according to claim 5, wherein:
   i) the thermoplastic polymer (A) is organic and is selected from a polyurethane, a polyurea, a polyamide, a polyimide, a polyketone, a polyester, a polyether, a polyoxide, a polyamine, a polysilylene, a polyetherimide, a polyetherketone, a polyacrylate, a polysulfide, a polythiophene, a polyphosphazene, a polyphenylene, a polyoxazole, a polythiazole, a polyimidazole, a polybenzoxazine, a polybenzothiazole, a polycarborane, a polysulfone, a polyanhydride, a polysulfonamide, a polycarbohydrate, a polycarbonate, a polyacetal, a polyolefin, a polyvinyl, a polyvinylidiene, a polyvinylchloride, a polyaromatic, a polydiene, a polydiyne, a polypeptide, a polyamide-polyether, a styrenic block copolymer, an ionomer, poly(ethylene-vinyl acetate), an acrylonitrile butadiene styrene, and copolymers thereof;
   ii) the silicone elastomer (B) comprises the vulcanized product of (B1) an organopolysiloxane having an average of at least two silicon-bonded alkenyl groups per molecule; (B2) an organosilicon compound having an average of at least two silicon-bonded hydrogen atoms per molecule; and (C) a hydrosilylation catalyst; wherein the thermoplastic silicone vulcanizate composition is re-processable; or
   iii) both i) and ii).

7. The method according to claim 6, wherein: i) the thermoplastic polymer (A) is a polyurethane; ii) the organopolysiloxane (B1) comprises a substantially linear diorganopolysiloxane; or both i) and ii).

8. The method according to claim 7, wherein the thermoplastic polymer (A) is a polyurethane and the organopolysiloxane (B1) comprises a substantially linear diorganopolysiloxane.

9. The method according to claim 1, wherein the first and second thermoplastic silicone compositions are different from one another.

10. The method according to claim 1, wherein: i) the first and second thermoplastic silicone compositions solidify upon exposure to ambient conditions for a period of time; ii) heat is applied to the first thermoplastic silicone composition during I); or iii) both i) and ii).

11. The method according to claim 1, wherein the 3D printer is selected from a fused filament fabrication printer, a selective laser sintering printer, a selective laser melting printer, a stereolithography printer, a powder bed (binder jet) printer, a material jet printer, a direct metal laser sintering printer, an electron beam melting printer, a laminated object manufacturing deposition printer, a directed energy deposition printer, a laser powder forming printer, a polyjet printer, an ink-jetting printer, a material jetting printer, and a syringe extrusion printer, alternatively wherein the method comprises fused filament fabrication.

12. The method according to claim 1, wherein the at least partially solidified layer formed in I) retains its shape upon exposure to ambient conditions.

13. A 3D article formed in accordance with the method of claim 1.

* * * * *